United States Patent
Nishimura et al.

(10) Patent No.: US 6,604,295 B2
(45) Date of Patent: Aug. 12, 2003

(54) MICROSCOPIC GEOMETRY MEASURING DEVICE

(75) Inventors: Kunitoshi Nishimura, Tsukuba (JP); Kazuhiko Hidaka, Tsukuba (JP); Kiyokazu Okamoto, Tsukuba (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 09/805,309

(22) Filed: Mar. 13, 2001

(65) Prior Publication Data

US 2002/0124427 A1 Sep. 12, 2002

(30) Foreign Application Priority Data

Mar. 14, 2000 (JP) ........................................ 2000-070216

(51) Int. Cl.[7] ................................................ G01B 5/20
(52) U.S. Cl. .............................. 33/554; 33/551; 33/556; 33/559
(58) Field of Search .......................... 33/533, 549, 551, 33/553, 554, 555, 556, 558, 559, 561, 832, 833

(56) References Cited

U.S. PATENT DOCUMENTS

| | | | | |
|---|---|---|---|---|
| 4,519,141 A | * | 5/1985 | Meder et al. | 33/559 |
| 5,146,690 A | * | 9/1992 | Breitmeier | 33/551 |
| 5,440,122 A | * | 8/1995 | Yasutake | 250/443 |
| 5,572,798 A | * | 11/1996 | Barnaby | 33/549 |
| 5,705,741 A | * | 1/1998 | Eaton et al. | 33/551 |
| 6,044,569 A | * | 4/2000 | Ogihara et al. | 33/503 |
| 6,307,084 B1 | * | 10/2001 | Matsuki et al. | 33/561 |
| 6,314,800 B1 | * | 11/2001 | Nishimura | 33/551 |
| 6,370,788 B1 | * | 4/2002 | Hellier et al. | 33/559 |

FOREIGN PATENT DOCUMENTS

| | | | | |
|---|---|---|---|---|
| JP | 55085204 A | * | 12/1978 | 33/556 |
| JP | 57190206 A | * | 11/1982 | 33/556 |
| JP | 61086601 A | * | 5/1986 | 33/561 |
| JP | 0013542 | * | 5/1990 | 33/531 |
| JP | 10356187 | | 12/1998 | |
| JP | 11272451 | | 9/1999 | |

* cited by examiner

Primary Examiner—Diego Gutierrez
Assistant Examiner—Travis Reis
(74) Attorney, Agent, or Firm—Webb Ziesenheim Logsdon Orkin & Hanson, P.C.

(57) ABSTRACT

A fine feed mechanism (50) and a coarse feed mechanism (60) respectively for minutely and greatly displacing a stylus (12) is provided to a microscopic geometry measuring device (1), so that the respective mechanisms (50, 60) are combinedly actuated for easily controlling the movement of the stylus (12) in a wide range at a short time. Further, a movable balancing portion (53) moving in a direction opposite to a movable driving portion (52) is provided to the fine feed mechanism (50). Since a reaction force caused by the movement of the movable driving portion (52) is cancelled by another reaction force caused by the movement of the movable balancing portion (53) at a fixed portion (51), no mechanical interference is caused between the respective mechanisms (50, 60), thus accurately controlling the movement of the stylus (12).

10 Claims, 7 Drawing Sheets

MICROSCOPIC GEOMETRY MEASURING DEVICE

BACKGROUND OF THE INVENTION

1. Field of the Invention

The present invention relates to a microscopic geometry measuring device. More specifically, it relates to a microscopic geometry measuring device for accurately measuring a surface profile of LSI (large scale integration) and other semiconductor wafers.

2. Description of the Related Art

Conventionally, in accurately measuring the surface profile of a LSI and other semiconductor wafer, it is strongly desired to maintain a measuring force applied between a workpiece and a stylus in contact with the surface of the workpiece below a predetermined level. This is because damage to the workpiece and to the stylus can be prevented and the surface profile of the workpiece can be accurately reflected on the movement of the stylus by keeping the measuring force below a predetermined level. In order to meet the demand, a specially designed measuring device provided with a mechanism for controlling the measuring force below a predetermined level is used in accurately measuring the surface profile of semiconductor wafers.

The Applicant of the present application has proposed a measuring device disclosed in Japanese Patent Laid-Open Publication No. Hei 10-356187 as a conventional example of such measuring device. In FIG. 6, the measuring device 100 has a pivotable arm 101, a stylus mechanism 103 having a stylus 102 provided on a lower surface of an end of the arm 101 to be in contact with a workpiece, a measuring force adjusting mechanism 104 for adjusting a measuring force applied to the stylus 102, a displacement sensor 105 for detecting the position of the arm 101, and a measuring force control circuit 106 for controlling the measuring force adjusting mechanism 104. Here, reference numeral 101 A represents a pivot fulcrum of the arm 101 and 101B represents a balance weight provided on the other end of the arm 101. Displacements are recorded by computer 108.

The Applicant has also proposed a stylus mechanism disclosed in Japanese Patent Application No. Hei 11-272451 as the stylus mechanism 103 used in the measuring device 100.

The stylus mechanism 103 has a holder 103A to be attached to the arm 101, a stylus 102 held on the holder 103A and having a contact portion 102A to be in contact with the workpiece at the distal end thereof, a vibrator for resonantly vibrating the stylus 102 in an axial direction thereof, and a sensor for detecting a change in the resonance caused when the contact portion 102A touches the workpiece.

The measuring force adjusting mechanism 104 is composed of a magnetic substance 104A fixed on an upper side of the arm 101 and an electromagnetic actuator having an electromagnet 104B disposed right above the magnetic substance 104A. When the electromagnet 104B is electrified, a repulsive or attractive force is caused between the magnetic substance 104A and the electromagnet 104B to move the arm 101 vertically, so that the stylus 102 provided on one end of the arm 101 vertically displaces. A distance between the surface of the workpiece and the one end of the arm 101 is controlled by controlling the electrical current to the electromagnet 104B, thus keeping the measuring force applied between the stylus 102 and the workpiece below a predetermined level.

While the stylus 102 of the measuring device 100 is brought into contact with the surface of the workpiece, the stylus 102 is moved along the surface when measuring the workpiece. When the contact portion 102A of the stylus 102 touches the surface of the workpiece, the output signal from the sensor changes in accordance with vibration change of the stylus 102. The output signal is detected by a detecting circuit 107. The measuring force control circuit 106 controls the measuring force adjusting mechanism 104 (electromagnetic actuator) based on information from the detecting circuit 107, thus controlling the measuring force applied between the workpiece and the stylus 102.

The measuring device 100 controls the movement of the arm 101, i.e. the movement of the contact portion 102A of the stylus 102 with a single electromagnetic actuator (the measuring force adjusting mechanism 104). In order to move the contact portion 102A to follow the workpiece surface while applying the predetermined level of measuring force, the contact portion 102A has to be moved in a direction perpendicular to the workpiece surface in an order ranging from a nanometer to a millimeter.

However, there is $10^6$ divergence between the nanometer and the millimeter order. When the movement of the contact portion 102A is controlled with the above range by the single electromagnetic actuator, supposing the minimum value of the electromagnetic actuator is controlled at 1 mV (i.e., controlling $1*10^{-6}$ mm at 1 mV), the maximum value has to be controlled at 1000 V (i.e. controlling 1 mm at 1000 V). Since the control value range is too wide, the measuring force control has been difficult.

SUMMARY OF THE INVENTION

An object of the present invention is to provide a microscopic geometry measuring device capable of easily and accurately controlling the movement of the stylus from nanometer to millimeter order so that the stylus accurately follows the workpiece surface at a predetermined measuring force, thus reducing damage on the workpiece and the stylus and improving the measurement accuracy.

The inventors has contemplated combining two mechanisms, i.e. a fine feed mechanism for displacing the stylus within a range from a nanometer order to a micrometer order, and a coarse feed mechanism for displacing the stylus from a micrometer order to a millimeter order, to move the stylus within the range from the nanometer order to the millimeter order. For instance, a piezoelectric element (PZT) may be utilized as the fine feed mechanism, and an electromagnetic actuator may be utilized for the coarse feed mechanism, both of which can be constructed using a known technique. The combination of the known fine feed mechanism and the coarse feed mechanism may be conducted, for instance, by providing the stylus on a movable portion of the fine feed mechanism and providing a fixed portion of the fine feed mechanism to a movable portion of the coarse feed mechanism.

However, when the fine feed mechanism and the coarse feed mechanism are simply combined, the reaction force caused by the movement of the movable portion of the fine feed mechanism influences the fixed portion of the fine feed mechanism to apply force to the movable portion of the coarse feed mechanism provided with the fixed portion. In other words, a mechanical interference is caused between the fine feed mechanism and the coarse feed mechanism. When the mechanical interference is caused between the fine feed mechanism and the coarse feed mechanism, the stylus displaces in a complicated and uncontrollable manner, so that the measuring force cannot be controlled by an accurate control of the stylus movement. Uncontrollable measuring force applied to the stylus results in deterioration in measurement accuracy and, possibly, damage on the workpiece and the stylus.

In order to eliminate the mechanical interference between the fine feed mechanism and the coarse feed mechanism, the mass of the fixed portion of the fine feed mechanism may be set sufficiently greater than the mass of the movable portion, so that the reaction force of the movable portion is absorbed by the fixed portion to block the force applied from the fine feed mechanism to the coarse feed mechanism. However, in this case, since the mass of the entire fine feed mechanism is increased and the mass applied on the movable portion of the coarse feed mechanism for the fine feed mechanism to be provided is increased, the responsivity of the coarse feed mechanism is lowered, so that the measurement speed cannot be increased.

In order to eliminate mutual interference between the fine feed mechanism and the coarse feed mechanism without greatly increasing the mass of the movable portion of the coarse feed mechanism, a microscopic geometry measuring device according to the present invention has following arrangement.

According to an aspect of the present invention, a microscopic geometry measuring device has: a stylus to be in contact with a workpiece; a quantity of state sensor for quantitatively detecting a state which changes when the stylus is in contact with the workpiece; a drive mechanism for relatively moving the stylus and the workpiece in a direction substantially perpendicular to the surface of the workpiece; a displacement sensor for detecting a relative movement of the stylus and the workpiece by the drive mechanism; and a measuring force control circuit for adjusting a measuring force applied to the stylus, where the drive mechanism has a fine feed mechanism having a fixed portion and a movable driving portion displacing relative to the fixed portion for minutely displacing the stylus and/or the workpiece and a coarse feed mechanism having a movable portion attached to the fixed portion of the fine feed mechanism for displacing the stylus and/or the workpiece, the fine feed mechanism having a movable balancing portion structured approximately identical with the movable driving portion of the fine feed mechanism to be moved in a direction opposite to a movement direction of the movable driving portion. The measuring force control circuit actuates at least one of the fine feed mechanism and the coarse feed mechanism based on an output signal from the state sensor to adjust the measuring force applied to the stylus.

The microscopic geometry measuring device has two mechanisms, i.e. the fine feed mechanism for minutely displacing the stylus within a range, for instance, from nanometer order to micrometer order and the coarse feed mechanism for greatly displacing the stylus within a range from micrometer order to the millimeter order. In order to drive the stylus within a range of the nanometer order to the micrometer order, the fine feed mechanism is actuated. In order to drive the stylus within a range of micrometer order to millimeter order, the coarse feed mechanism is actuated. By combining the actuation of the fine feed mechanism and the coarse feed mechanism, the movement of the stylus can be easily controlled within a range from the nanometer order to the millimeter order at a short time.

Further, since the fine feed mechanism has a movable balancing portion having approximately the same structure as the movable driving portion of the fine feed mechanism being driven in a direction opposite to the driving direction of the movable driving portion, the reaction force to the fixed portion in actuating the movable driving portion is cancelled at the fixed portion of the fine feed mechanism by the reaction force applied to the fixed portion generated by actuating the movable balancing portion (a force opposite to the reaction force generated by actuating the movable driving portion). In other words, the reaction force by the movable driving portion of the fine feed mechanism does not influence on the movable portion of the coarse feed mechanism. Accordingly, since there is no mechanical interference between the fine feed mechanism and the coarse feed mechanism, the stylus does not complicatedly or uncontrollably displace, thus accurately controlling the movement of the stylus with the fine feed mechanism and the coarse feed mechanism. Therefore, the measuring force applied to the stylus can be accurately controlled to reduce damage on the workpiece and the stylus while improving measurement accuracy.

In the above arrangement, the stylus may preferably resonantly vibrate in an axial direction thereof, and the quantity of state sensor may preferably detect the vibration of the stylus.

Generally, since the flexural natural frequency in the axial direction is lower than the natural frequency in the axial direction, the stylus vibrating in the axial direction has higher responsivity than a stylus with flexural vibration in the axial direction. Accordingly, the measuring force applied to the stylus can be more accurately controlled by detecting the vibration as a quantity of state of the highly-responsive stylus with the detector, the vibration changing when the stylus touches the workpiece, so that the fine feed mechanism and the coarse feed mechanism are actuated based on the information from the detector.

In the above aspect of the present invention, the movement direction of the fine feed mechanism and the coarse feed mechanism may preferably be along an axial direction of the stylus.

Accordingly, since the moving direction of the fine feed mechanism and the coarse feed mechanism are along the axial direction of the stylus, the stylus can be moved while the axial direction of the stylus is along the height direction of the surface of the workpiece. In other words, since the stylus can be securely pressed against the surface of the workpiece along the axial direction thereof, the change in vibration of the stylus resonantly vibrating along the axial direction thereof can be more accurately detected by the detector.

In the above aspect of the present invention, the stylus may preferably be longitudinally approximately orthogonal with a movement direction of the fine feed mechanism and the coarse feed mechanism and may preferably be provided to the fine feed mechanism through an elastic lever elastically deformable in a direction along the movement direction, the quantity of state sensor detecting an elastic deformation of the elastic lever.

Accordingly, the elastic lever elastically deforms by virtue of the measuring force applied to the stylus. The measuring force can be controlled by actuating the fine feed mechanism and the coarse feed mechanism based on the elastic deformation of the elastic lever.

In the above aspect of the present invention, the fine feed mechanism may preferably include a high-speed minute displacement solid element such as a piezoelectric element and a magnetostrictor.

Accordingly, by laminating thin plates of PZT (lead zirconate titanate) having electrostrictive effect to construct the piezoelectric element, the electrically controllable fine feed mechanism can be easily constructed. The high-speed minute displacement solid element may be magnetostrictor and shape memory alloy as well as the piezoelectric element such as PZT.

In the above aspect of the present invention, the coarse feed mechanism may preferably include: a fixed portion; a movable portion movable in a height direction of the surface of the workpiece relative to the fixed portion; and a parallel pair of arm spaced apart in height direction of the surface of the workpiece, the pair of arm having one end rotatably secured to the fixed portion and the other end rotatably secured to the movable portion.

Since the movable portion is held on the parallel pair of arm vertically spaced apart relative to the fixed portion, the movable portion can be vertically moved without changing attitude thereof. Accordingly, when the stylus is provided to the movable portion, the stylus can be moved without changing the attitude of the stylus.

Further, since the arm is provided to the fixed portion and the movable portion through the elastic hinge without requiring lubricant oil, the coarse feed mechanism can be kept clean and is effective for measuring surface profile of a semiconductor wafer.

Further, since the rotary movement of the arm by virtue of the elastic hinge has smaller friction than a rotary movement of the arm using a rolling bearing etc., the movable portion can be accurately moved in parallel without slack.

In another aspect of the present invention, the coarse feed mechanism may preferably include an air bearing or an elastic plate spring.

Since the coarse feed mechanism uses an air bearing or an elastic plate spring without requiring lubricant oil, the coarse feed mechanism can be kept clean, thus being suitable for measuring surface profile of semiconductor wafer.

In a further aspect of the present invention, the displacement sensor may preferably include a fist displacement sensor for detecting a relative movement between the stylus and the workpiece caused by the fine feed mechanism and a second displacement sensor for detecting a relative movement between the stylus and the workpiece caused by the coarse feed mechanism.

Since the microscopic geometry measuring device has the first displacement sensor for detecting the movement of the stylus by the fine feed mechanism and the second displacement sensor for detecting the movement of the stylus by the coarse feed mechanism, the displacements of the stylus by the fine feed mechanism and the coarse feed mechanism can be detected independently, thus facilitating independent control of the fine feed mechanism and the coarse feed mechanism.

In further aspect of the present invention, the displacement sensor may preferably detect a relative movement between the stylus and the workpiece caused by the fine feed mechanism and the coarse feed mechanism.

Since the displacement sensor for detecting the movement of the stylus by the fine feed mechanism and the coarse feed mechanism is composed as a single component, the cost can be reduced.

DETAILED DESCRIPTION OF PREFERRED EMBODIMENT(S)

Respective embodiments of the present invention will be described below with reference to attached drawings.

First Embodiment

Figure 1:
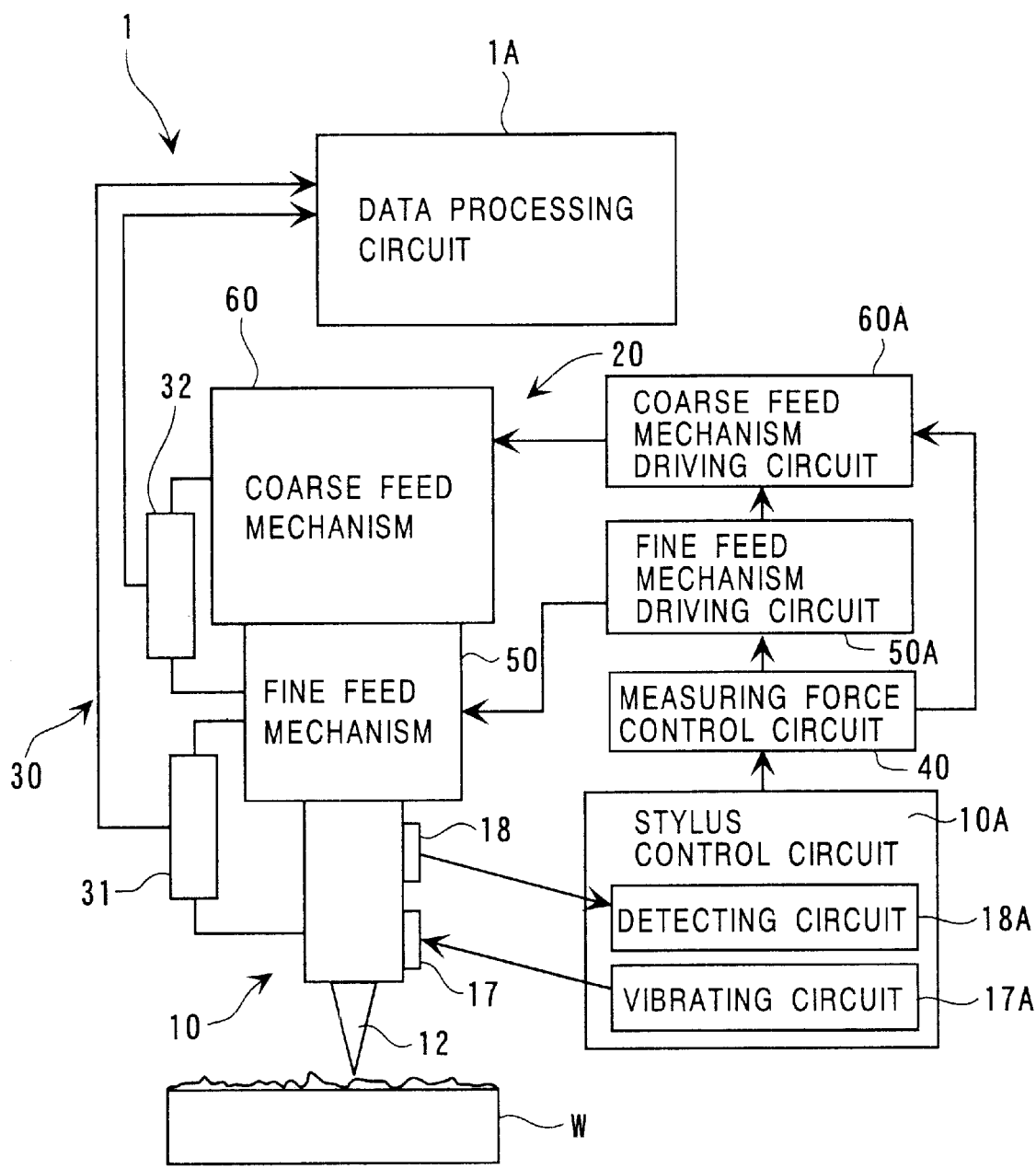
FIG. 1 is a general block diagram showing a microscopic geometry measuring device according to first embodiment of the present invention.

FIG. 1 is a general block diagram showing a microscopic geometry measuring device according to first embodiment of the present invention.

The measuring device 1 has a stylus mechanism 10 having a stylus 12 to be in contact with a workpiece W, a drive mechanism 20 for vertically (in height direction of the surface of the workpiece W) moving the stylus 12, a displacement sensor for detecting the movement of the stylus 12 by the drive mechanism 20, and a measuring force control circuit 40 for adjusting a measuring force applied to the stylus 12.

Figure 2:
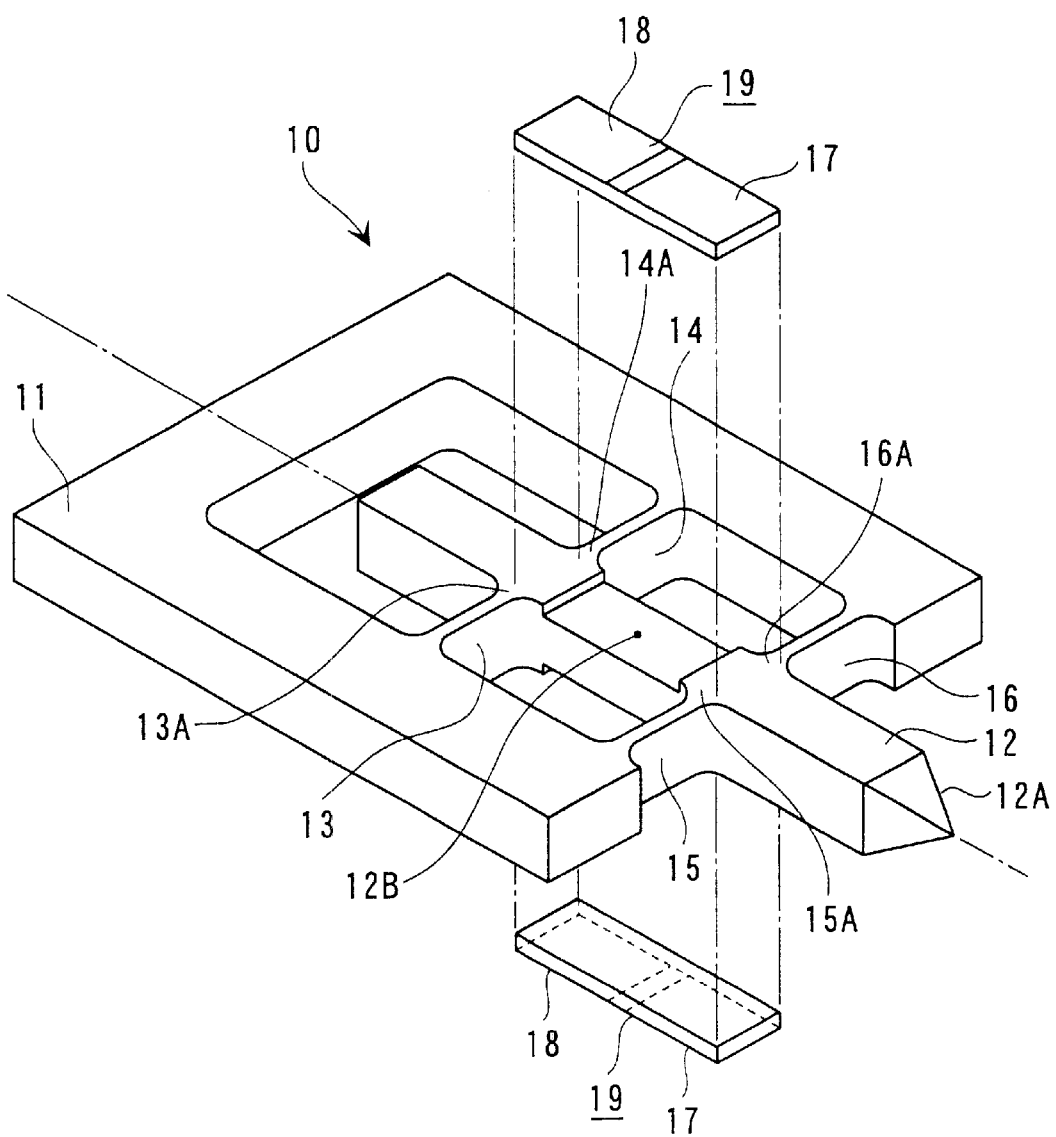
FIG. 2 is an enlarged perspective view showing a stylus mechanism of the aforesaid embodiment.

The stylus mechanism 10 has, as shown in FIG. 2, an approximately C-shaped holder 11, a stylus 12 having a contact portion 12A to be in contact with the workpiece W at the distal end thereof, the stylus 12 being supported by the holder 11 with a distal end protruding from an opening, four connecting members 13, 14, 15 and 16 for connecting the holder 11 and the stylus 12, a vibrator 17 for resonantly vibrating the stylus 12 in an axial direction thereof, and a detector 18 as a quantity of state sensor for detecting a change in resonance when the contact portion 12A of the stylus 12 touches the workpiece W.

The stylus 12 is formed in a pillar, the centroid 12B of the stylus 12 being approximately at the center of the stylus 12 in the axial direction and being on the axis. In other words, the stylus 12 is approximately symmetrical with regard to the axial direction thereof.

The connecting members 13, 14, 15 and 16 of the stylus 12 are connected to respective connecting portions 13A, 14A, 15A and 16A, where a distance from the connecting portions 13A and 14A to the stylus centroid is equal to the distance from the connecting portions 15A and 16A to the stylus centroid. In other words, the connecting portions 13A and 14A and the connecting portions 15A and 16A are respectively provided axially symmetrical around the centroid 12B of the stylus 12. Further, the connecting portion 13A and the connecting portion 14A are axially symmetrical relative to the axis of the stylus 12 respectively. Similarly, the connecting portion 15A and the connecting portion 16A are axially symmetrical relative to the axis of the stylus 12 respectively. In other words, the four connecting portions 13A, 14A, 15A and 16A are symmetrical relative to the stylus centroid and axially symmetrical relative to the axis of the stylus.

The vibrator 17 and the detector 18 are formed in an integrated piezoelectric element 19, which is provided on the front and back side of the stylus 12 to stretch over the connecting portions 13A, 14A, 15A and 16A. Though not shown, a vibrating electrode and a detecting electrode are formed on the surface of the piezoelectric element 19. The vibrator 17 and the detector 18 are constructed respectively by providing the vibrating electrode with a lead wire for applying a vibrating voltage and providing the detecting electrode with a lead wire for applying a detecting voltage.

Back to FIG. 1, when a predetermined signal is sent from the vibrating circuit 17A of a stylus control circuit 10A to the vibrator 17, the stylus 12 resonantly vibrates in the axial direction thereof. The resonance changes when the contact portion 12A of the stylus 12 touches the workpiece W. The change being detected by the detector 18 so that a detected signal is transmitted to the measuring force control circuit 40 through the detecting circuit 18A of the stylus control circuit 10A.

Figure 3:
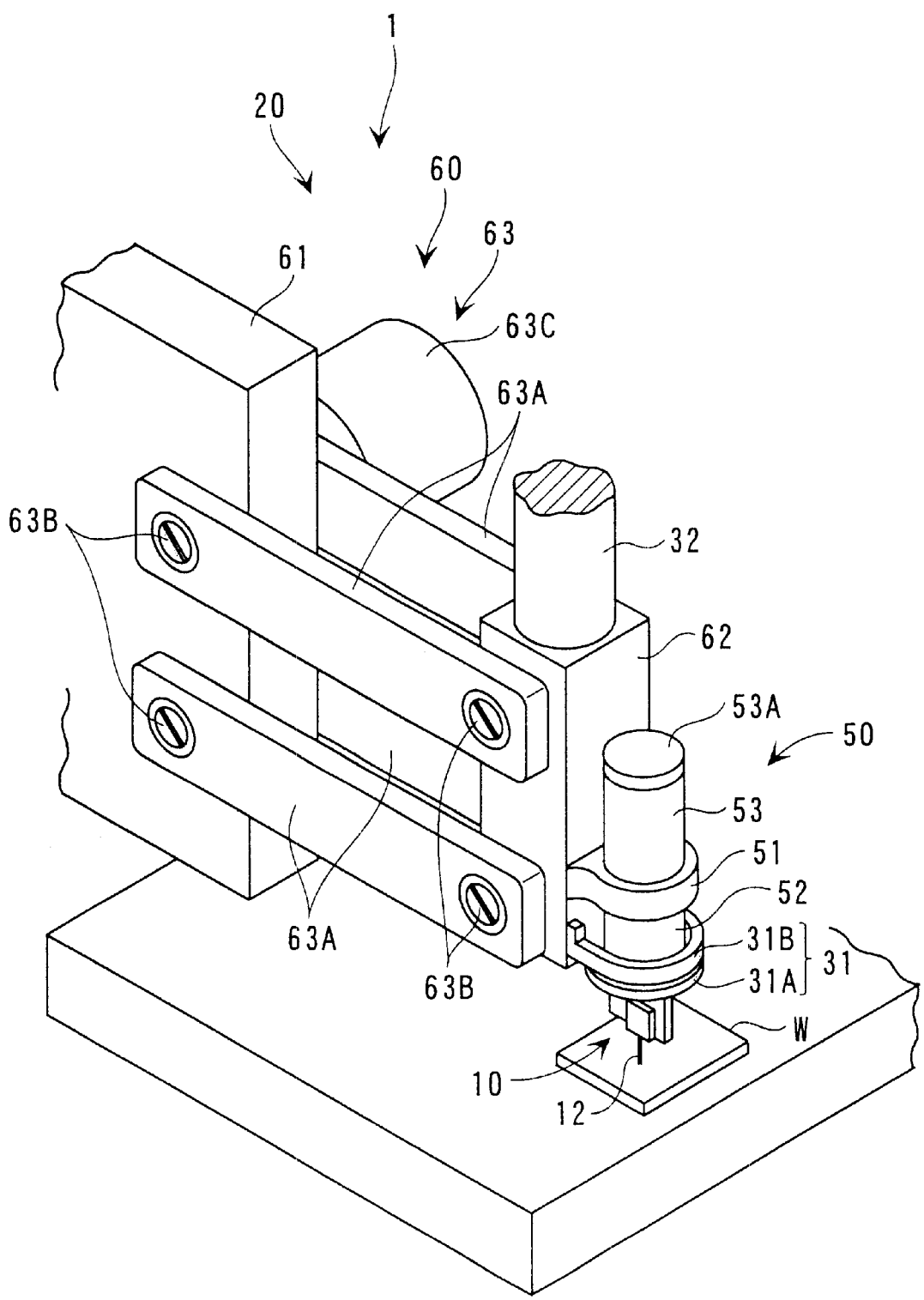
FIG. 3 is a perspective view showing a drive mechanism of the aforesaid embodiment.

As shown in FIGS. 1 and 3, the drive mechanism 20 has a fine feed mechanism 50 for minutely displacing the stylus 12 within a range from a nanometer order to a micrometer order, and a coarse feed mechanism 60 for greatly displacing the stylus 12 from a micrometer order to a millimeter order.

The fine feed mechanism 50 has a fixed portion 51 (see FIG. 3) fixed to below-described movable portion 62 of the coarse feed mechanism 60, a movable driving portion 52 provided on a lower side of the fixed portion 51, and a movable balancing portion 53 provided on an upper side of the fixed portion 51. The movable driving portion 52 and the movable balancing portion 53 move oppositely relative to the fixed portion 51 as a base point. The stylus 12 is provided on a lower side of the movable driving portion 52 through the holder 11. The axial direction of the stylus 12 extends along a height direction of the workpiece W (i.e. movement direction of the fine feed mechanism 50 and the coarse feed mechanism 60). A balancer 53A is provided on an upper side of the movable balancing portion 53 as necessary.

The movable driving portion 52 and the movable balancing portion 53 are respectively constituted by laminating thin plates of piezoelectric element (PZT) and have approximately the same structure. When voltages of approximately the same waveform are applied to thus structured movable driving portion 52 and the movable balancing portion 53, both piezoelectric elements simultaneously stretch or simultaneously contract. Since the movable driving portion 52 and the movable balancing portion 53 stretch and contract relative to the fixed portion 51 as a base point, when a predetermined voltage for stretching the piezoelectric elements is applied, the movable driving portion 52 stretches downwardly relative to the fixed portion 51 as a base point and the movable balancing portion 53 stretches upwardly relative to the fixed portion 51 as a base point. On the other hand, when a predetermined voltage for contracting the piezoelectric elements is applied, the movable driving portion 52 contracts upwardly relative to the fixed portion 51 as a base point and the movable balancing portion 53 contracts downwardly relative to the fixed portion 51 as a base point.

Accordingly, the reaction force to the fixed portion 51 in actuating the movable driving portion 52 is cancelled at the fixed portion 51 of the fine feed mechanism 50 by the reaction force applied to the fixed portion 51 generated by actuating the movable balancing portion 53 (a force opposite to the reaction force generated by actuating the movable driving portion 52). In other words, the reaction force by the movable driving portion 52 of the fine feed mechanism 50 does not influence on the movable portion 62 of the coarse feed mechanism 60. Incidentally, the mass of the balancer 53A of the movable balancing portion 53 is arranged so that the respective reaction forces of the movable driving portion 52 and the movable balancing portion 53 become equal.

The coarse feed mechanism 60 has a fixed portion 61 fixed to a base (not shown), the movable portion 62 vertically (in height direction of the surface of the workpiece W) movable relative to the fixed portion 61 by virtue of a parallel linkage, and a drive means 63 for vertically moving the movable portion 62.

The drive means 63 has a pair of arms 63A with both ends rotatably attached to the fixed portion 61 and the movable portion 62, the arms being vertically spaced apart and disposed in parallel, an elastic hinge 63B for rotatably holding the ends of the arms 63A relative to the fixed portion 61 and the movable portion 62, and a drive motor 63C having an output shaft connected to the elastic hinge 63B to rotate the arm 63A. The pairs of arms 63A are respectively provided on both sides of the fixed portion 61 and the movable portion 62.

The displacement sensor 30 has a first displacement sensor 31 for detecting a movement of the stylus 12 by the fine feed mechanism 50, and a second displacement sensor 32 for detecting a movement of the stylus 12 by the coarse feed mechanism 60.

The first displacement sensor 31 has a movable electrode 31A provided on a lower side of the movable driving portion 52 of the fine feed mechanism 50, and a fixed electrode 31B opposing the movable electrode 31A vertically spaced apart therefrom. The fixed electrode 31B is formed in a ring-shape with a part thereof being fixed to the movable portion of the coarse feed mechanism 60, to which the movable driving portion 52 is inserted in a vertically movable manner.

When the movable driving portion 52 stretches and contracts, the movable electrode 31A provided on the lower end of the movable driving portion 52 vertically displaces, so that the distance between the movable electrode 31A and the fixed electrode 31B changes. When the distance between the movable electrode 31A and the fixed electrode 31B changes, electrostatic capacitance between the movable electrode 31A and the fixed electrode 31B changes, so that the distance between the movable electrode 31A and the fixed electrode 31B, i.e. the movement of the lower end of the movable driving portion 52, can be detected by detecting the electrostatic capacitance.

The second displacement sensor 32 detects a displacement of the movable portion 62 of the coarse feed mechanism 60 to output the result to the data processing circuit. The specific structure of the second displacement sensor 32 is not limited, which may be arranged by an indicator.

The sum of respective displacements of the stylus 12 detected by the first displacement sensor 31 and the second displacement sensor 32 is the total displacement of the stylus 12 by the fine feed mechanism 50 and the coarse feed mechanism 60.

As shown in FIG. 1, the measuring force control circuit 40 controls the actuation of the fine feed mechanism 50 and the coarse feed mechanism 60 through a fine feed mechanism driving circuit 50A and a coarse feed mechanism driving circuit 60A after receiving the detected signal transmitted from a detecting circuit 18A of the stylus control circuit 10A. The detecting circuit 18A outputs the change in resonance detected by the detector 18 as a signal corresponding to amplitude change. The measuring force control circuit 40 calculates a difference between a predetermined signal value corresponding to the measuring force control circuit 40 and the output signal from the detecting circuit 18A, which is transmitted to the fine feed mechanism driving circuit 50A and the coarse feed mechanism driving circuit 60A, together with calculated differential value and integral value as necessary.

When the measuring force actually applied to the stylus 12 becomes greater than the predetermined value, the measuring force control circuit 40 transmits a signal to the fine feed mechanism driving circuit 50A and the coarse feed mechanism driving circuit 60A to move the lower end of the movable driving portion 52 away from the workpiece W. On the other hand, when the measuring force actually applied to the stylus 12 becomes smaller than the predetermined value, the measuring force control circuit 40 transmits a signal to the fine feed mechanism driving circuit 50A and the coarse feed mechanism driving circuit 60A so that the lower end of the movable driving portion 52 moves toward the workpiece W to press the stylus 12 against the workpiece W.

In the microscopic geometry measuring device 1, the stylus 12 is brought into contact with the surface of the workpiece W with a predetermined measuring force and the stylus 12 is moved along the surface for measurement.

While the stylus 12 is resonantly vibrated in the axial direction thereof and the contact portion 12A of the stylus 12 keeps in contact with the surface of the workpiece W, the stylus 12 and the workpiece W are relatively moved in horizontal direction (in a direction orthogonal with the height direction of the surface of the workpiece W). Then, the distance between the surface of the workpiece W and the lower end of the movable driving portion 52 changes on account of irregularities of the surface of the workpiece W, so that the measuring force applied between the workpiece W and the stylus 12 changes. The change in the measuring force causes the change in the amplitude of the stylus 12, which is detected by the detector 18 so that the signal caused thereby is transmitted to the measuring force control circuit 40 through the detecting circuit 40. The measuring force control circuit 40 calculates based on the information from the detecting circuit 18A. The result of the calculation is transmitted to the fine feed mechanism driving circuit 50A and the coarse feed mechanism driving circuit 60A to drive the fine feed mechanism 50 and the coarse feed mechanism 60 by the respective driving circuits 50A and 60A. Accordingly, the distance between the surface of the workpiece W and the lower end of the movable driving portion 52 can be adjusted based on the change in the amplitude of the stylus 12, thus keeping the measuring force applied between the workpiece W and the contact portion 12A at a predetermined value.

On the other hand, the movement of the stylus 12 is detected by the first displacement sensor 31 and the second displacement sensor 32, so that the cross section of the workpiece W is calculated by the data processing circuit 1A based on the information.

According to the above-described present embodiment, following effects can be obtained.
(1) The microscopic geometry measuring device 1 has two mechanisms of the fine feed mechanism 50 for minutely displacing the stylus 12 within a range from nanometer order to micrometer order and the coarse feed mechanism 60 for greatly displacing the stylus 12 within a range from micrometer order to the millimeter order. In order to drive the stylus 12 within a range of the nanometer order to the micrometer order, the fine feed mechanism 50 is actuated. In order to drive the stylus 12 within a range of micrometer order to millimeter order, the coarse feed mechanism 60 is actuated. By combining the actuation of the fine feed mechanism 50 and the coarse feed mechanism 60, the movement of the stylus 12 can be easily controlled within a range from the nanometer order to the millimeter order at a short time.

Further, since the fine feed mechanism 50 has a movable balancing portion 53 having approximately the same structure as the movable driving portion 52 of the fine feed mechanism 50 being driven in a direction opposite to the driving direction of the movable driving portion 52, the reaction force to the fixed portion 51 in actuating the movable driving portion 52 is cancelled at the fixed portion 51 of the fine feed mechanism 50 by the reaction force applied to the fixed portion 51 generated by actuating the movable balancing portion 53 (a force opposite to the reaction force generated by actuating the movable driving portion 52). In other words, the reaction force by the movable driving portion 52 of the fine feed mechanism 50 does not influence on the movable portion 62 of the coarse feed mechanism 60. Accordingly, since there is no mechanical interference between the fine feed mechanism 50 and the coarse feed mechanism 60, the stylus 12 does not complicatedly or uncontrollably displace, thus accurately controlling the movement of the stylus 12 with the fine feed mechanism 50 and the coarse feed mechanism 60. Therefore, the measuring force applied to the stylus 12 can be accurately controlled to reduce damage on the workpiece W and the stylus 12 while improving measurement accuracy.

(2) Generally, since the flexural natural frequency in the axial direction is lower than the natural frequency in the axial direction, the stylus 12 vibrating in the axial direction has higher responsivity than a stylus with flexural vibration in the axial direction. Accordingly, the measuring force applied to the stylus 12 can be more accurately controlled by detecting the vibration as a quantity of state of the highly-responsive stylus 12 with the detector 18, the vibration changing when the stylus 12 touches the workpiece W, so that the fine feed mechanism 50 and the coarse feed mechanism 60 are actuated based on the information from the detector 18.

(3) Since the moving direction of the fine feed mechanism 50 and the coarse feed mechanism 60 are along the axial direction of the stylus 12, the stylus 12 can be moved while the axial direction of the stylus 12 is along the height direction of the surface of the workpiece W. In other words, since the stylus 12 can be securely pressed against the surface of the workpiece W along the axial direction thereof, the change in vibration of the stylus 12 resonantly vibrating along the axial direction thereof can be more accurately detected by the detector 18.

(4) Since the fine feed mechanism 50 is made by laminating thin plates of PZT (lead zirconate titanate) having electrostrictive effect, the electrically controllable fine feed mechanism 50 can be easily constructed.

(5) Since the movable portion 62 of the coarse feed mechanism 60 is held on the parallel pair of arm 63A vertically spaced apart relative to the fixed portion 61, the movable portion 62 can be vertically moved without changing attitude thereof. Accordingly, the fine feed mechanism 50 and the stylus 12 can be moved without changing the attitude of the fine feed mechanism 50 and the stylus 12 provided to the movable portion 62.

Further, since the arm 63A is provided to the fixed portion 61 and the movable portion 62 through the elastic hinge 63B without requiring lubricant oil, the coarse feed mechanism can be kept clean and is effective for measuring surface profile of a semiconductor wafer.

Further, since the rotary movement of the arm 63A by virtue of the elastic hinge 63B has smaller friction than a rotary movement of the arm using a rolling bearing etc., the movable portion 62 can be accurately moved in parallel without slack.

(6) Since the microscopic geometry measuring device 1 has the first displacement sensor 31 for detecting the movement of the stylus 12 by the fine feed mechanism 50 and the second displacement sensor 32 for detecting the movement of the stylus 12 by the coarse feed mechanism 60, the displacements of the stylus 12 by the fine feed mechanism 50 and the coarse feed mechanism 60 can be detected independently, thus facilitating independent control of the fine feed mechanism 50 and the coarse feed mechanism 60.

Second Embodiment

Figure 4:
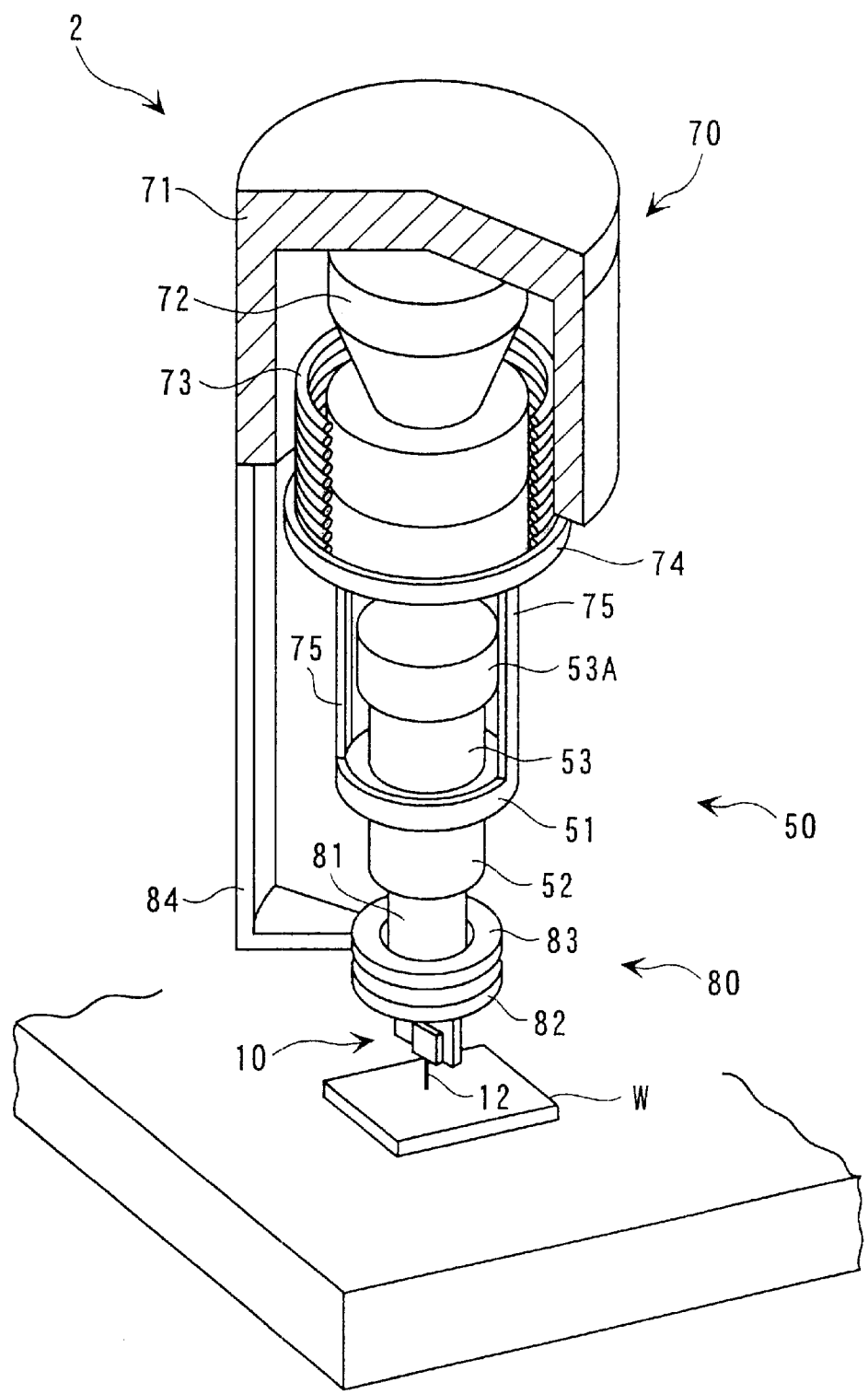
FIG. 4 is a perspective view showing a primary portion of a microscopic geometry measuring device according to second embodiment of the present invention.

FIG. 4 shows a microscopic geometry measuring device 2 according to the second embodiment of the present invention. Since the present embodiment and the above-described first embodiment differ only in the arrangement of the coarse feed mechanism and the displacement sensor and the other arrangements and functions are the same, the same reference numeral will be attached to the same or similar components to omit or simplify the description therefor.

A coarse feed mechanism 70 vertically moves the fine feed mechanism 50 and the stylus 12 by vertically moving a movable coil 73 within a gap of a magnetic circuit composed of a yoke 71 fixed to a base (not shown) and a permanent magnet 72 and providing the fine feed mechanism 50 on the lower end side of the movable coil 73. A plate 74 is fixed to the lower end of the movable coil 73. The fixed portion 51 of the fine feed mechanism 50 is fixed to a support member 75 projecting downwardly from the plate 74, thus mounting the fine feed mechanism 50 to the movable coil 73. The fine feed mechanism 50 and the stylus 12 can be vertically moved by controlling the electric current running in the movable coil 73. Incidentally, the movable coil 73 is held by, for instance, fixing one end of the plate spring elastically deformable in the movement direction of the movable coil 73 to the supporting member 75 and the other end of the plate spring to the base.

A displacement sensor 80 has a movable electrode 82 fixed to a lower side of the movable driving portion 52 of the fine feed mechanism 50 through an intermediate member 81, and a fixed electrode 83 vertically spaced apart from and opposing to the movable electrode 82. The fixed electrode 83 is formed in a ring-shape and is held on the if yoke 71 of the coarse feed mechanism 70 through a L-shaped holding member 84 with the intermediate member 81 inserted in vertically movable manner.

The displacement sensor 80 detects the electrostatic capacitance between the fixed electrode 83 and the movable electrode 82 to detect the movement of the stylus 12 by the fine feed mechanism 50 and the coarse feed mechanism 80, which is different from the first displacement sensor of the first embodiment. Specifically, since the fixed electrode 31B of the first displacement sensor 31 is fixed to the movable portion 62 of the coarse feed mechanism 60, the movement of the stylus 12 relative to the movable portion 62 of the coarse feed mechanism 60 is detected. On the other hand, since the fixed electrode 83 of the displacement sensor 80 is provided to the yoke 71 fixed to the base of the coarse feed mechanism 70, the movement of the stylus 12 relative to the yoke 71 (fixed portion) of the coarse feed mechanism is detected.

According to the above-described present embodiment, following effect as well as the effects (1) to (4) of the aforesaid first embodiment can be obtained.

(7) Since the displacement sensor 80 for detecting the movement of the stylus 12 by the fine feed mechanism 50 and the coarse feed mechanism 80 is composed as a single component, the cost of the displacement sensor 80 can be reduced.

Modifications

Incidentally, the scope of the present invention is not restricted to the above respective embodiments, but modifications and improvements are included in the present invention as long as an object of the present invention can be achieved.

Figure 5:
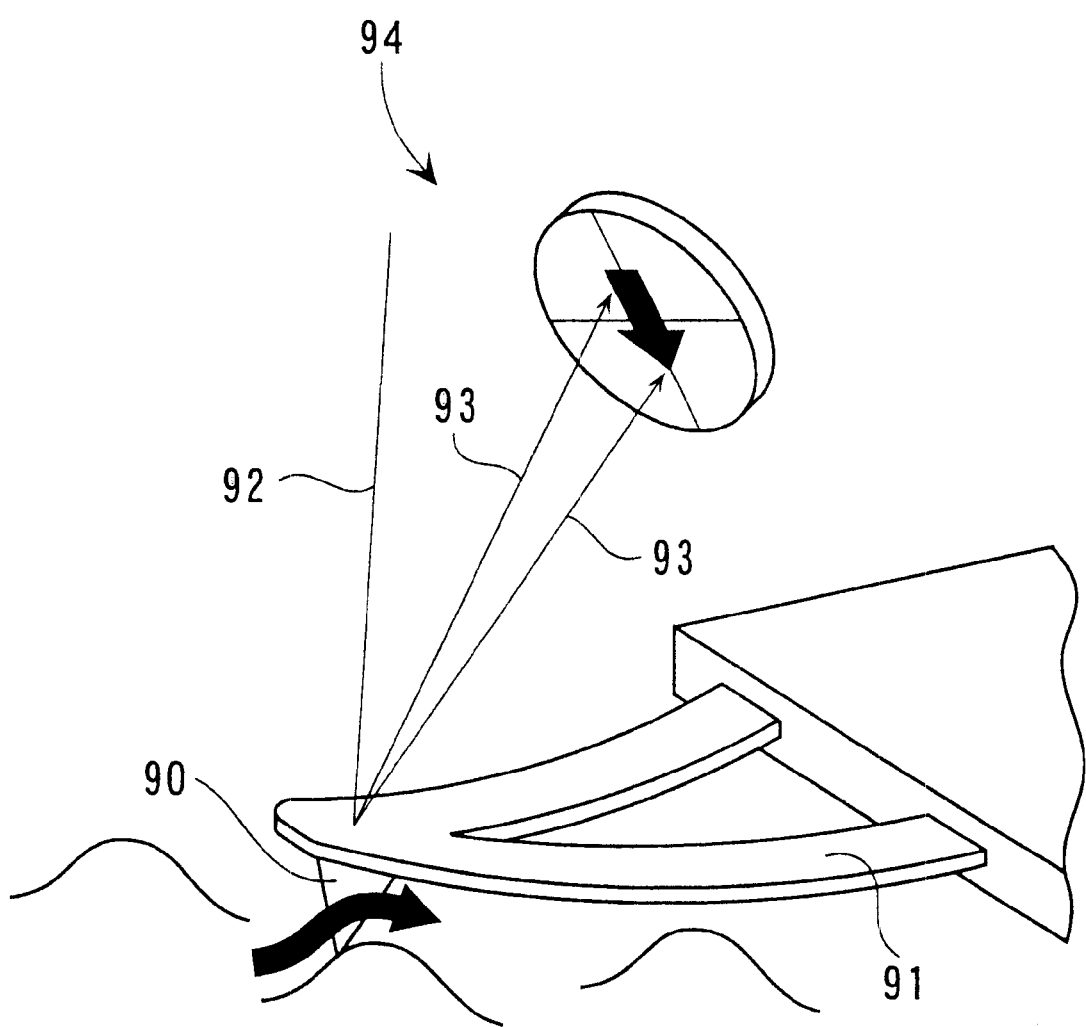
FIG. 5 is a perspective view showing a modification of the present invention.
Figure 6:
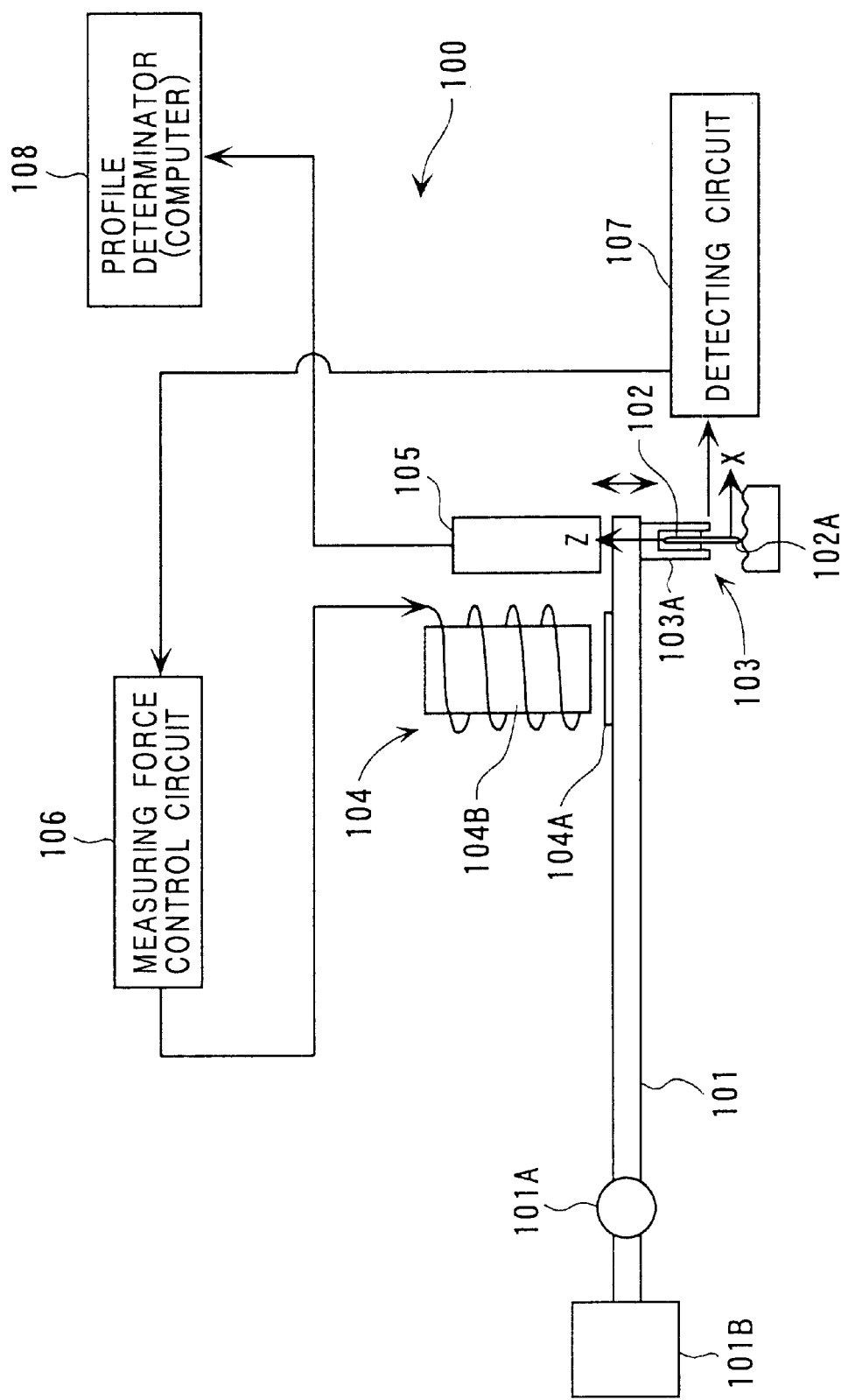
FIG. 6 is a general block diagram showing a conventional measuring device.
Figure 7:
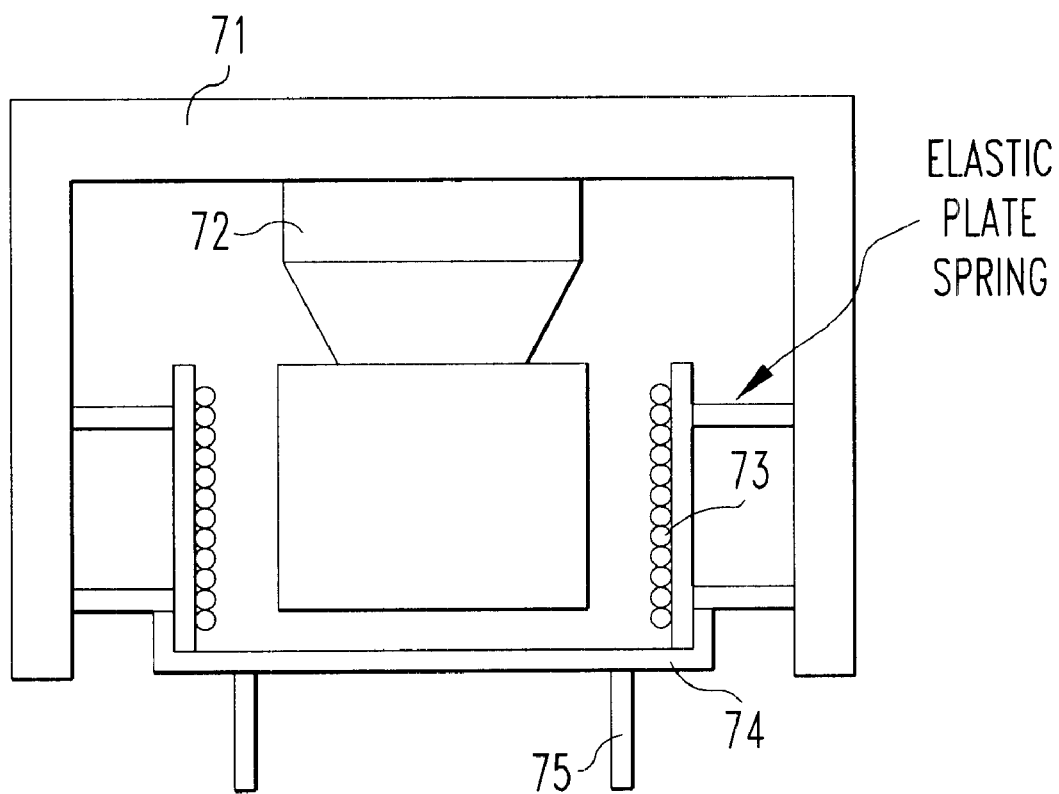
FIG. 7 is a section view of the embodiment shown in FIG. 4.

For instance, though the axially vibrating stylus 12 is used in the respective embodiments, the stylus of the present invention is not restricted to such arrangement, but a stylus 90 as shown in FIG. 5 may be used.

The stylus 90 is provided to the movable driving portion of the fine feed mechanism through an elastic lever 91 of which longitudinal direction is approximately orthogonal with the movement direction of the fine feed mechanism and the coarse feed mechanism, the elastic lever 91 being deformable in a direction along the movement direction. When the above stylus is brought into contact with the surface of the workpiece W, the measuring force applied between the workpiece W and the stylus 90 causes elastic deformation to the elastic lever 91. Accordingly, the change in measuring force can be recognized by detecting the elastic deformation of the elastic lever 91. The detector for detecting the elastic deformation of the elastic lever 91 may be, for instance, composed of a distortion sensor, or alternatively, a sensor 94 for detecting the deformation of the elastic lever 91 based on a reflected light 93 from irradiated laser light 92 etc. onto the upper side of the elastic lever 91.

Though the stylus 12 is minutely displaced from nanometer order to micrometer order by the fine feed mechanism 50 and the stylus 12 is greatly displaced by the coarse feed mechanisms 60 and 70, the movement range of the stylus by the fine feed mechanism and the coarse feed mechanism may be appropriately arranged according to target workpiece.

Though the fine feed mechanism 50 is composed of a piezoelectric element in the aforesaid respective embodiments, the fine feed mechanism 50 may be composed of an electromagnetic actuator of movable coil used in the coarse feed mechanism, or alternatively, may be composed of a high-speed minute displacement solid element such as magnetostrictor and shape memory alloy.

A magnetostrictor or magnetostriction transducer is a device that controllably changes length as a result of magnetostriction. Magnetostriction is a known phenomenon in which a material increases in length in the direction of a magnetic field when subjected to such field.

Though the coarse feed mechanism 60 is constructed by a parallel linkage and the coarse feed mechanism 70 is made using the movable coil 73, the coarse feed mechanism of the present invention is not limited to such arrangement, but may include air bearing or elastic plate spring. In this arrangement, since the coarse feed mechanism uses an air bearing or an elastic plate spring without requiring lubricant oil, the coarse feed mechanism can be kept clean, thus being suitable for measuring surface profile of semiconductor wafer.

Though the stylus 12 is moved relative to the workpiece W in the above respective embodiments, the workpiece may be moved relative to the stylus. In other words, the measuring force may be controlled by relatively moving the stylus and the workpiece.

What is claimed is:

1. A microscopic geometry measuring device, comprising:
    a stylus to be in contact with a workpiece;
    a sensor for detecting a quantitative change in state when the stylus is in contact with the surface of the workpiece;
    a drive mechanism comprising a fine feed mechanism and a coarse feed mechanism for relatively moving the stylus and the workpiece in a direction substantially perpendicular to the surface of the workpiece;
    a displacement sensor for detecting a relative movement of the stylus and the workpiece surface by the drive mechanism; and
    a measuring force control circuit for adjusting a measuring force applied to the stylus,
    the drive mechanism fine feed mechanism having a fixed portion and a movable driving portion displacing relative to the fixed portion for minutely displacing the stylus and/or the workpiece; and the drive mechanism coarse feed mechanism having a movable portion attached to the fixed portion of the fine feed mechanism for relatively displacing the stylus and the workpiece, the fine feed mechanism having a movable balancing portion structured approximately identical with the movable driving portion of the fine feed mechanism to be moved in a direction opposite to a movement direction of the movable driving portion, and the movement direction of the fine feed mechanism and the coarse feed mechanism is along an axial direction of the stylus,
    wherein the measuring force control circuit actuates the fine feed mechanism and the coarse feed mechanism based on an output signal from the quantity of state sensor to adjust the measuring force applied to the stylus, and wherein the reaction force caused by movement of the fine feed mechanism on the coarse feed mechanism is minimized.

2. The microscopic geometry measuring device according to claim 1, wherein the stylus resonantly vibrates in an axial direction thereof, and wherein the quantity of state sensor detects the vibration of the stylus.

3. The microscopic geometry measuring device according to claim 1, wherein the stylus is connected to the fine feed mechanism by a lever that is longitudinally approximately orthogonal with a movement direction of the fine feed mechanism and the coarse feed mechanism and is elastically deformable in a direction along the movement direction, and
    wherein the quantity of state sensor detects an elastic deformation of the elastic lever.

4. The microscopic geometry measuring device according to claim 1, wherein the fine feed mechanism includes a high-speed minute displacement solid element.

5. The microscopic geometry measuring device according to claim 1, the coarse feed mechanism comprising:
    a fixed portion;
    a movable portion movable in a height direction of the surface of the workpiece relative to the fixed portion; and
    a parallel pair of arms spaced apart in height direction of the surface of the workpiece, the pair of arms having one end rotatably secured to the fixed portion and the other end rotatably secured to the movable portion.

6. The microscopic geometry measuring device according to claim 1, wherein the coarse feed mechanism comprises:
    a cylindrical fixed yoke;
    a permanent magnet secured inside said yoke;
    a movable portion supporting a coil and plate at the lower end thereof to which the fine feed mechanism may be attached; and
    an elastic plate spring securing the movable portion inside said yoke.

7. The microscopic geometry measuring device according to claim 1, wherein the displacement sensor includes a first displacement sensor for detecting a relative movement between the stylus and the workpiece caused by the fine feed mechanism and a second displacement sensor for detecting a relative movement between the stylus and the workpiece caused by the coarse feed mechanism.

8. The microscopic geometry measuring device according to claim 1, wherein the displacement sensor detects a relative movement between the stylus and the workpiece caused by the fine feed mechanism and the coarse feed mechanism.

9. The microscopic geometry measuring device according to claim 4, wherein the displacement solid element is a piezoelectric element.

10. The microscopic geometry measuring device according to claim 4, wherein the displacement solid element is a magnetostrictor.

* * * * *